United States Patent
Hazama

[11] Patent Number: 6,089,460
[45] Date of Patent: Jul. 18, 2000

[54] SEMICONDUCTOR DEVICE WITH SECURITY PROTECTION FUNCTION, CIPHERING AND DECIPHERING METHOD THEREOF, AND STORAGE MEDIUM FOR STORING SOFTWARE THEREFOR

[75] Inventor: Katsuki Hazama, Chiyoda-ku, Japan

[73] Assignee: Nippon Steel Corporation, Tokyo, Japan

[21] Appl. No.: 08/928,462

[22] Filed: Sep. 12, 1997

[30] Foreign Application Priority Data

Sep. 13, 1996 [JP] Japan ..................... 8-265582

[51] Int. Cl.$^7$ ................ G06K 19/06; H04L 9/00
[52] U.S. Cl. .............................. 235/492; 380/4
[58] Field of Search ................ 235/492; 380/4; 711/163, 202, 209

[56] References Cited

U.S. PATENT DOCUMENTS

| | | | |
|---|---|---|---|
| 3,798,360 | 3/1974 | Feistel | 178/22 |
| 4,004,089 | 1/1977 | Richard et al. | 178/22 |
| 4,484,025 | 11/1984 | Ostermann et al. | 178/22.09 |
| 4,751,733 | 6/1988 | Delayaye et al. | 380/42 |
| 4,914,697 | 4/1990 | Dabbish et al. | 380/28 |
| 5,666,411 | 9/1997 | McCarty | 380/4 |
| 5,692,047 | 11/1997 | McManis | 380/4 |
| 5,752,035 | 5/1998 | Trimberger | 395/705 |
| 5,835,592 | 11/1998 | Chang et al. | 380/21 |
| 5,847,577 | 12/1998 | Trimberger | 326/38 |
| 5,867,507 | 2/1999 | Beebe et al. | 371/22.31 |
| 5,890,189 | 3/1999 | Nozue et al. | 711/100 |
| 5,898,783 | 4/1999 | Rohrbach | 380/49 |
| 5,963,980 | 10/1999 | Coulier et al. | 711/163 |

FOREIGN PATENT DOCUMENTS

| | | |
|---|---|---|
| 63-293637 | 11/1988 | Japan . |
| 2-138367 | 2/1990 | Japan . |
| 4-11420 | 4/1992 | Japan . |
| 4-232588 | 4/1992 | Japan . |
| 7-168750 | 7/1995 | Japan . |

*Primary Examiner*—Michael G Lee
*Assistant Examiner*—Daniel H. Sherr
*Attorney, Agent, or Firm*—Pollock, Vande Sande & Amernick

[57] ABSTRACT

A semiconductor device is provided with a data security protection function. A ciphering program is given from a control device to a logic-changeable logical circuit. The logical circuit changes its logic in accordance with the ciphering program. Data to be stored is ciphered on the basis of the changed logic, and then stored in a memory device. It is possible to store the data in the memory device as it is and to cipher the data on the basis of the changed logic when the data is output from the memory device. Further, it is possible to cipher an address related to the data. Further, a deciphering program is given from the control device to the logic circuit. The logic circuit changes its logic on the basis of the deciphering program. The ciphered data is applied a deciphering process on the basis of the changed logic. The ciphering and/or the deciphering processes can be stored in a computer readable medium for causing a computer to execute those processes.

27 Claims, 7 Drawing Sheets

SEMICONDUCTOR DEVICE WITH SECURITY PROTECTION FUNCTION, CIPHERING AND DECIPHERING METHOD THEREOF, AND STORAGE MEDIUM FOR STORING SOFTWARE THEREFOR

BACKGROUND OF THE INVENTION

The present invention relates to a semiconductor device provided with a data security protection function, data ciphering and deciphering methods, and a storage medium for storing software for activating the security protection function of the semiconductor device.

Generally, non-volatile semiconductor memory devices can be roughly classified into a mask ROM (Read Only Memory) and an EEPROM (Electrically Erasable Programmable Read Only Memory). The mask ROM stores data on the basis of the presence or absence of contact holes or active field oxide films. On the other hand, the EEPROM stores data on the basis of the presence or absence of electric charges.

The mask ROM has a relatively small area required for storing one-bit data and thereby a high integration is enabled. However, when the structure thereof is analyzed under a microscope, the stored data can be easily understood. Therefore, it has been impossible to store secret data by use of the mask ROM as it is.

A semiconductor device provided with the security protection function is disclosed in Japanese Patent Laid-Open No. 4(1992)-232588. Particularly, this device is provided with the security protection function for IC cards. The semiconductor device includes a ROM for storing software for basic control, etc., an EEPROM for storing a program for ciphering and a ciphering key, a RAM for storing an identification number of a manufacturer, etc., and a CPU for controlling the ciphering function.

Further, Japanese Patent Laid-Open No. 4(1992)-11420 discloses a one-chip microcomputer provided with a non-volatile memory for storing ID data to be ciphered, a ciphering circuit for ciphering the ID data, a control circuit, etc.

Further, Japanese Patent Laid-Open No. 63(1988)-293637 discloses a one-chip microcomputer provided with a non-volatile memory (ROM) for storing a ciphered program and ID data, a volatile memory (RAM) for storing keys for ciphering and deciphering, and a rewritable memory (EEPROM) for storing data ciphered by the ciphering key.

In these semiconductor devices, since the EEPROM stores data on the basis of the presence or absence of electric charge accumulation, it is impossible to decipher the stored program on the basis of structural analysis. Therefore, it is impossible to decipher the logic for ciphering and deciphering secret data. Accordingly, it has been extremely difficult to decipher the secret data ciphered in the mask ROM.

However, because the EEPROMs of these semiconductor device have a relatively large area required for one-bit data, there exists a problem in that a high integration is difficult to achieve. In addition, in these devices, since the secret data are ciphered and deciphered by processing programs by use of a CPU, there exist other problems in that a relatively long time is required to output data and further in that the CPU cannot execute other processing while the data are being output.

As described above, in the non-volatile semiconductor devices provided with a security protection function, there exists a problem in that a high integration is difficult and therefore the device cannot be manufactured at a low cost. In addition, the non-volatile semiconductor devices involve the problem that the stored data cannot be output at high speed and further, other different processing cannot be executed by the arithmetic unit while the data are being output.

SUMMARY OF THE INVENTION

With these problems in mind, therefore, it is an object of the present invention to provide a semiconductor device with a security protection function of stored contents, which can be operated at high speed and manufactured at low cost.

It is another object of the present invention to provide ciphering and deciphering methods used for the semiconductor device to conduct the security protection function.

It is still another object of the present invention to provide a storage medium for storing software for activating the semiconductor device to conduct the security protection function.

To achieve the above-mentioned object, the present invention provides a semiconductor device comprising: control means, having at least temporarily a program for at least either ciphering or deciphering for generating a signal corresponding to the program; logic-changeable logical means responsive to the signal for changing logic thereof in accordance with the program and for applying the program to at least either data or an address related to the data on the basis of the changed logic; and a memory device for storing the data.

Further, the present invention provides a method of code processing used for a semiconductor device having a logic-changeable logical circuit and a control circuit for controlling the logical circuit, comprising the steps of: supplying a program for at least either ciphering or deciphering to the control device; generating a signal corresponding to the program; applying the signal to the logical circuit to change logic thereof in accordance with the program; applying the program to at least either data or an address related to the data on the basis of the changed logic; and storing the data in a memory device.

Further, the present invention provides a computer readable medium storing program code for causing a computer to apply a program for at least either ciphering or deciphering to data of a semiconductor device having a logic-changeable logical circuit, and a control device for controlling the logical circuit, comprising: first program code means for supplying the program to the control device; second program code means for generating a signal corresponding to the program; third program code means for applying the signal to the logical circuit to change logic thereof in accordance with the program; fourth program code means for applying the program to at least either data or an address related to the data on the basis of the changed logic; and fifth program code means for storing the data in a memory device.

Further, the present invention provides a semiconductor device comprising a logic-changeable logical circuit, when at least either a ciphering or a deciphering program is supplied, the logic thereof being changed by means of the program to process a signal in accordance with the changed logic.

According to the invention, data input and output to and from a memory device are controlled under the program programmed into a logic-changeable logical circuit. The program can be set freely, so that it is hardly possible to decipher the set logic even if the circuit structure is analyzed. Further, logic programmed into the logic-changeable logical circuit is executed by way of hardware, so the processing speed thus can be increased.

DETAILED DESCRIPTION OF THE PREFERRED EMBODIMENTS

Preferred embodiments of the semiconductor device according to the present invention will be described hereinbelow with reference to the attached drawings.

Figure 1:
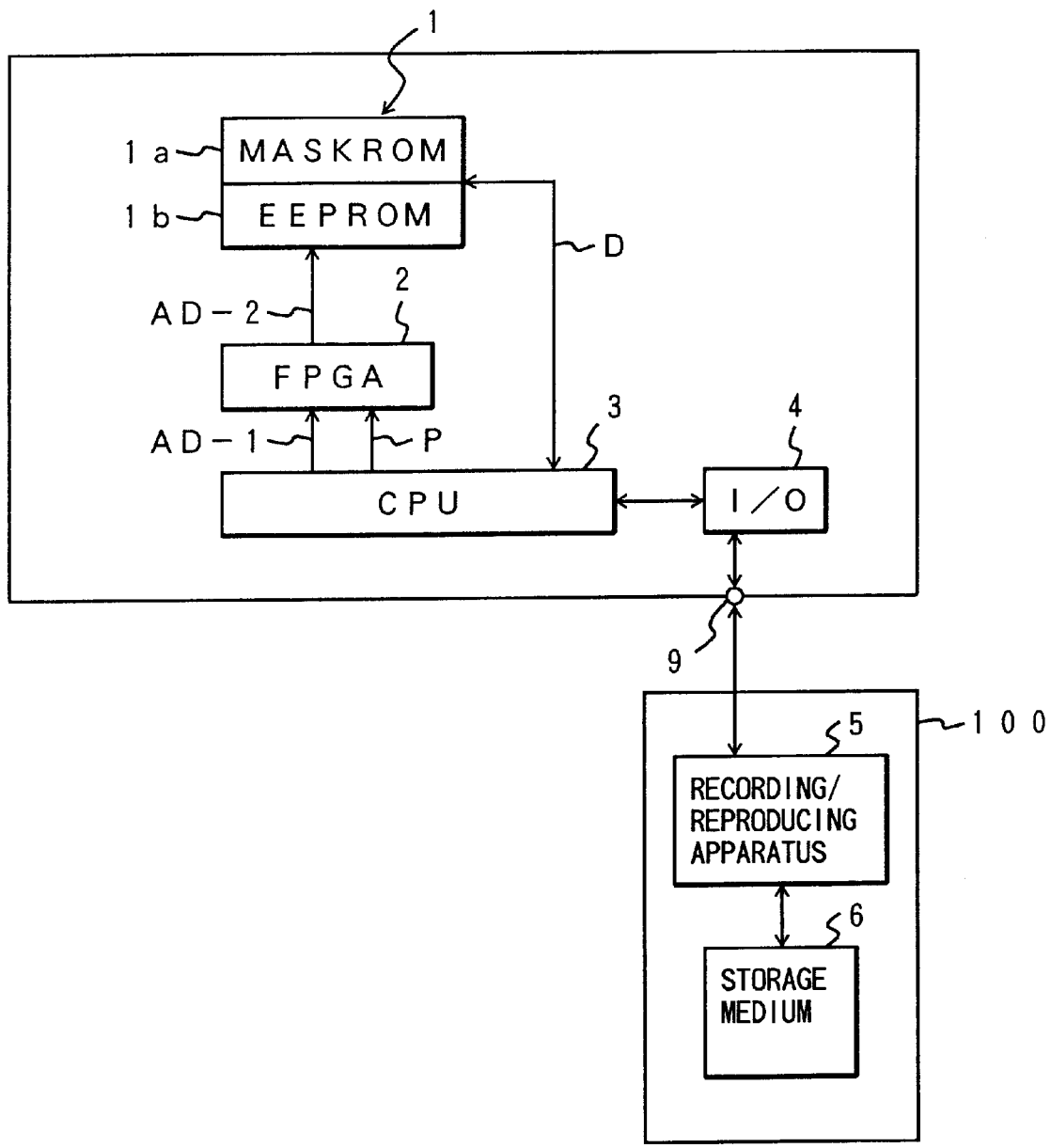
FIG. 1 is a block diagram showing the first embodiment of the semiconductor device according to the present invention.

As shown in FIG. 1, the semiconductor device as the first embodiment according to the present invention is provided with a memory device 1 having a mask ROM 1a and an EEPROM 1b. The memory device 1 has a small area enough for storing data and is capable of data rewriting. The mask ROM 1a stores ciphered secret data. Here, since the data stored in the mask ROM 1a is ciphered, even if the structure is analyzed under a microscope, it is hardly possible to decipher the data.

Further, the semiconductor device shown in FIG. 1 is provided with an FPGA (Field Programmable Gate Array) 2 of SRAM (Static Random Access Memory) type, and a CPU (Central Processing Unit) 3 as an arithmetic unit. Here, the FPGA implies a large-scale PLD (Programmable Logic Device) widely used recently as a general purpose logic integrated circuit. A user can electrically program the FPGA 2 to calculate input data to obtain the output data. Further, the FPGA 2 is a circuit for calculation at a high speed in a hardware way.

FIG. 1 further shows an external apparatus 100 for accepting stored data connected to the semiconductor device via output terminal 9. The external apparatus 100 is provided with a recording/reproducing apparatus 5 and a storage medium 6.

A method of deciphering secret data stored in the mask ROM 1a can be achieved with the FPGA 2 to convert a logical address AD-1 used for the CPU 3 into a structural address AD-2 used for the mask ROM 1a. Here, the structural address AD-2 is used to decipher and further read a lump of data ciphered and stored at scattered (at random) positions in the mask ROM 1a. In other words, as described later, the FPGA 2 receives the logical address AD-1 from the CPU 3, converts the logical address AD-1 into the structural address AD-2, and outputs the converted addresses to the mask ROM 1a.

An example of the deciphering operation of the semiconductor device shown in FIG. 1 will be explained hereinbelow with reference to a flowchart shown in FIG. 2.

Figure 2:
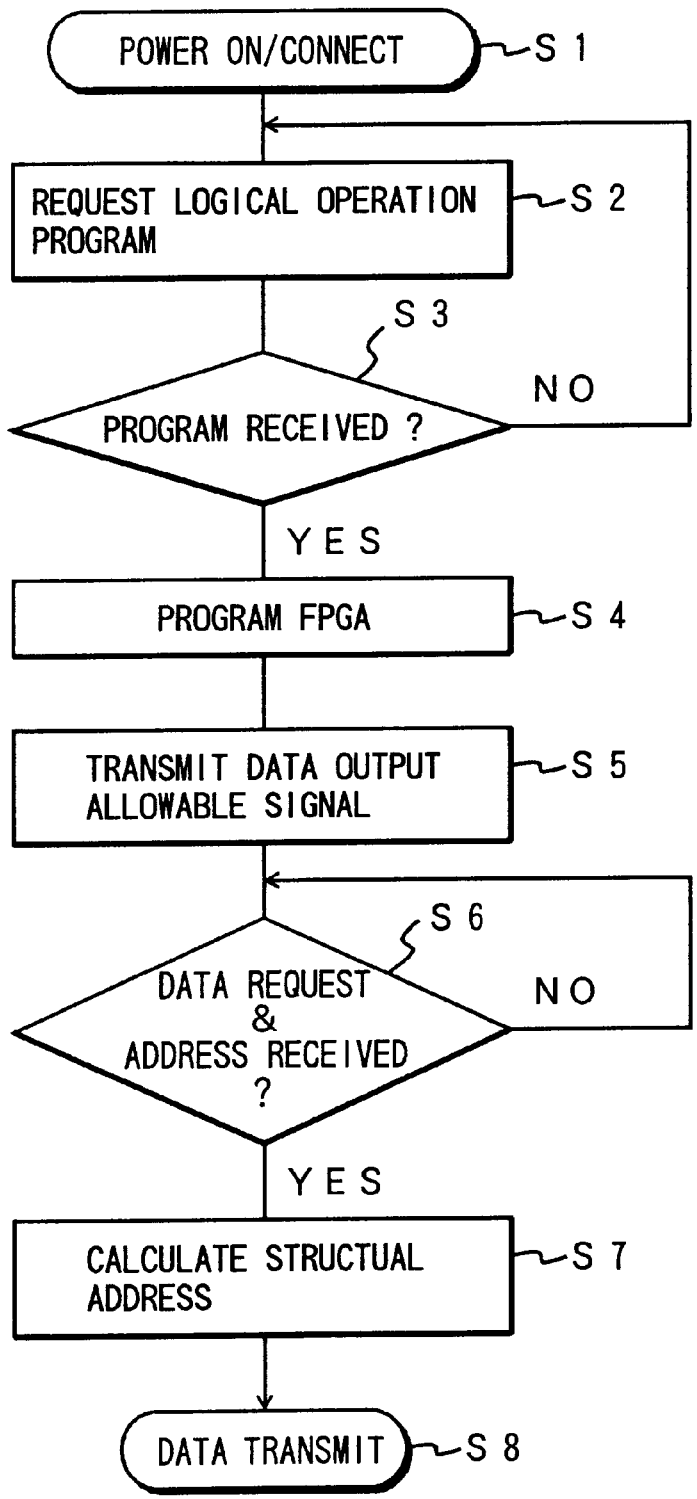
FIG. 2 is a flowchart showing an example of the deciphering operation of the semiconductor device shown in FIG. 1.

In FIG. 2, the power is on and the semiconductor device shown in FIG. 1 is connected to the external apparatus 100 in step S1. Then, the CPU 3 is activated to request the external apparatus 100 to designate a logical operation program P to be programmed into the FPGA 2 in step S2.

In response to this request, the recording/reproducing apparatus 5 reproduces program data from the storage medium 6, and further transmits the data to the semiconductor device.

In step S3, a data I/O section 4 receives the transmitted data and then, in step S4, the CPU 3 interprets the received data and outputs the program P to program the FPGA 2. Here, though not disclosed in detail, when wrong or false data is input, the semiconductor device is not set to the state where the data stored in the semiconductor device can be output correctly. The programming of the FPGA 2 is conducted by assembling AND and OR circuits freely, by turning some transistors on and others off among a great number of transistors previously arranged.

In the case of the logic circuits previously assembled by a predetermined logic, AND and OR circuits can be discriminated by tracing the wiring of the gate array under a microscope. It is thus possible to easily cipher the logic previously programmed into the logical circuits.

In contrast with this, since the first embodiment employs the FPGA 2, it is hardly possible to decipher the programmed logic even if the circuit structure is analyzed under a microscope, because any desired logic can be assembled later on the basis of the presence and absence of electric charges of transistors.

Upon the end of this programming, in step S5, the CPU 3 transmits a signal indicative that data can be output, to the external apparatus 100 via data I/O section 4. In response to the signal, data of a logical address is requested to be output from the external apparatus 100. In step S6, the CPU receives the logical address AD-1 via data I/O section 4 and outputs the address to the FPGA 2.

In step S7, the FPGA 2 calculates the structural address AD-2 on the mask ROM 1a on the basis of the logical address AD-1 in accordance with the program set in the step S4. The calculated structural address AD-2 is output to the mask ROM 1a. Further, in step S8, the mask ROM 1a outputs data D to the CPU 3 on the basis of the structural address AD-2 calculated by the FPGA 2. The CPU 3 then outputs the data D to the external apparatus 100 via data I/O section 4.

As described above, the first embodiment employs the FPGA 2 to decipher the ciphered data. Therefore, after programming the FPGA 2, it is possible to output the data at high speed. Further, the CPU 3 conducts data output only while the data are being output. The CPU 3 thus can execute other calculations. In this case, the CPU 3 can of course execute other data processing by use of the data stored in the masked ROM 1a. In addition, the circuit scale of the FPGA 2 is smaller than that of the EEPROM. The FPGA 2 thus can be formed at a high integration rate, so that the cost of the semiconductor device can be reduced.

As described above, since the first embodiment employs FPGA 2 of SRAM type, the data stored in the FPGA 2 are all destroyed when the power is off. Therefore, when the power is on again, it is necessary to execute the programming of the FPGA 2 again. However, this problem can be solved by use of the FPGA of EEPROM type, instead of the FPGA of SRAM type.

An example of the ciphering operation for storing the ciphered data in the EEPROM 1b shown in FIG. 1 will be explained hereinbelow with reference to a flowchart shown in FIG. 3.

Figure 3:
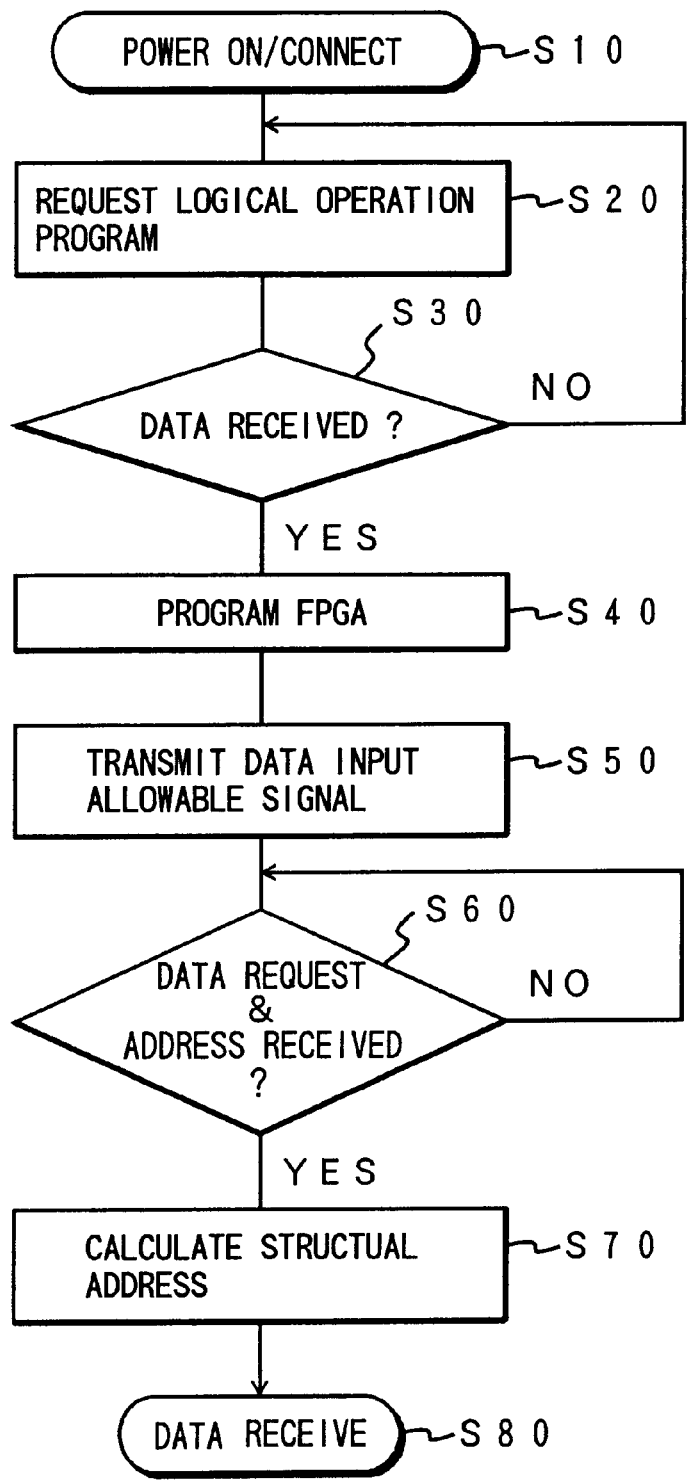
FIG. 3 is a flowchart showing an example of the ciphering operation of the semiconductor device shown in FIG. 1.

In FIG. 3, in step S10, when the power is on, the semiconductor device shown in FIG. 1 is connected to the recording/reproducing apparatus 5 and the storage medium 6. Then, in step S20, the CPU 3 is activated to request the external apparatus 100 to designate the logical operation program P to be programmed into the FPGA 2.

In response to this request, the recording/reproducing apparatus 5 reproduces program data from the storage medium 6, and further transmits the data to the semiconductor device. In step S30, the data I/O section 4 receives the transmitted data. Then, in step S40, the CPU 3 interprets the received data and programs the FPGA 2. Here, though also not disclosed in detail, when wrong or false data is input, the semiconductor device is not set to the state where the data stored in the semiconductor device can be input correctly.

Upon the end of this programming, in step S50, the CPU 3 transmits a signal indicative that data can be input, to the external apparatus 100 via data I/O section 4. In response to the signal, data of a logical address is requested to be input from the external apparatus 100. In step S60, the CPU 3 receives the logical address AD-1 via data I/O section 4, and the CPU 3 outputs the received logical address AD-1 to the FPGA 2.

In step S70, the FPGA 2 calculates the structural address AD-2 on the EEPROM 1b on the basis of the logical address AD-1 in accordance with the program set in the step S40, and outputs the calculated structural address to the EEPROM 1b. Further, in step S80, data is input from the external apparatus 100 to the CPU 3 via data I/O section 4, and then stored as the structural AD-2 to the EEPROM 1b.

As described above, the semiconductor device shown in FIG. 1 further employs the FPGA 2 to cipher the data to be stored. Therefore, after programming the FPGA 2, it is possible to input the data at high speed. Further, the CPU 3 executes data input only while the data is being input. The CPU 3 thus can execute other calculations.

An example of the method of calculating the structural address AD-2 by the FPGA 2 in step S70 will be explained hereinbelow.

Here, the assumption is made that the EEPROM 1b has the addresses in the range of 0000h to FFFFh. In this case, the arrangement of data to be stored according to the capacity of the EEPROM 1b exists from the number 0000h to the number FFFFh. Then, the data are rearranged in accordance with a predetermined rule, and then stored in the EEPROM 1b.

Table 1 lists a practical rearrangement of the data. In the case of the ABABh-th data, ABABh data is represented by binary numerals as $(1010\ 1011\ 1010\ 1011)_2$, and further these values are shifted to the left as $(0101\ 0111\ 0101\ 0111)_2$; in other words, the ABAB-th data is rearranged as the 5757h-th data.

TABLE 1

0000h $(0000\ 0000\ 0000\ 0000)_2$ → 0000h $(0000\ 0000\ 0000\ 0000)_2$
0001h $(0000\ 0000\ 0000\ 0001)_2$ → 0002h $(0000\ 0000\ 0000\ 0010)_2$
0002h $(0000\ 0000\ 0000\ 0010)_2$ → 0004h $(0000\ 0000\ 0000\ 0100)_2$
0003h $(0000\ 0000\ 0000\ 0011)_2$ → 0006h $(0000\ 0000\ 0000\ 0110)_2$
... ... ... ... ... ... ... ... ... ...
ABABh $(1010\ 1011\ 1010\ 1011)_2$ → 5757h $(0101\ 0111\ 0101\ 0111)_2$
ABACh $(1010\ 1011\ 1010\ 1100)_2$ → 5759h $(0101\ 0111\ 0101\ 1001)_2$

TABLE 1-continued

... ... ... ... ... ... ... ... ... ...
FFFDh $(1111\ 1111\ 1111\ 1101)_2$ → FFFBh $(1111\ 1111\ 1111\ 1011)_2$
FFFEh $(1111\ 1111\ 1111\ 1110)_2$ → FFFDh $(1111\ 1111\ 1111\ 1101)_2$
FFFFh $(1111\ 1111\ 1111\ 1111)_2$ → FFFFh $(1111\ 1111\ 1111\ 1111)_2$

In accordance with the newly formed arrangement, the data given externally are stored in the respective addresses of the EEPROM 1b via data I/O section 4 and CPU 3. Therefore, the arrangement of the data stored in the EEPROM 1b is a ciphered arrangement different from the original data arrangement, so that it is impossible to decipher the original data.

In order to decipher the data ciphered and then stored in the memory device 1 (i.e., processing in step S7), the structural address AD-2 is calculated that is shifted to the left from the logical address AD-1 input from the CPU 3 to the FPGA 2, and further the program for deciphering the address is written in the FPGA 2. Then, it is possible to read the data deciphered in accordance with this program.

As another practical rearrangement of the data, in Table 1, ABABh data, for instance are represented by binary numerals as $(1010\ 1011\ 1010\ 1011)_2$. Further a value $(0110\ 1101\ 0101\ 1100)_2$ is obtained by finding an exclusive logical sum of the above-mentioned binary numerals and a random number $(1100\ 0110\ 1111\ 0111)_2$, and the obtained value is rearranged at the 6B5Ah-th address. Further, in accordance with the newly formed arrangement, the data given externally are stored in the respective addresses of the EEPROM 1b via data I/O section 4 and CPU 3.

As described later, the present invention can be applied to an IC card, so that, when a user requests to add a new personal data or update the personal data already stored, it is possible to make smaller the capacity of the mask ROM 1a while enlarging that of the EEPROM 1b to enlarge rewritable memory area. Further, a volatile memory, such as a DRAM, can be used instead of the EEPROM 1b.

Further, in the above-mentioned ciphering and deciphering processing, an addressing program is written in the FPGA 2 when the EEPROM 1b is used.

A data processing apparatus using FPGA is disclosed in Japanese Patent Laid-Open No. 7(1995)-168750. The data processing apparatus is provided with an FPGA connected to a memory storing program data. A CPU controls a logic circuit of the FPGA under the program data. The data processing apparatus executes data communications between the CPU and peripheral units on the basis of this programmed FPGA. However, the data processing apparatus does not disclose that: ciphering and deciphering programs are written in the FPGA by the data supplied from the CPU; data ciphered by the FPGA is stored in the memory; and the ciphered and stored data is deciphered, as in the case of the present invention.

A second embodiment of the semiconductor device according to the present invention will be described hereinbelow with reference to FIG. 4.

Figure 4:
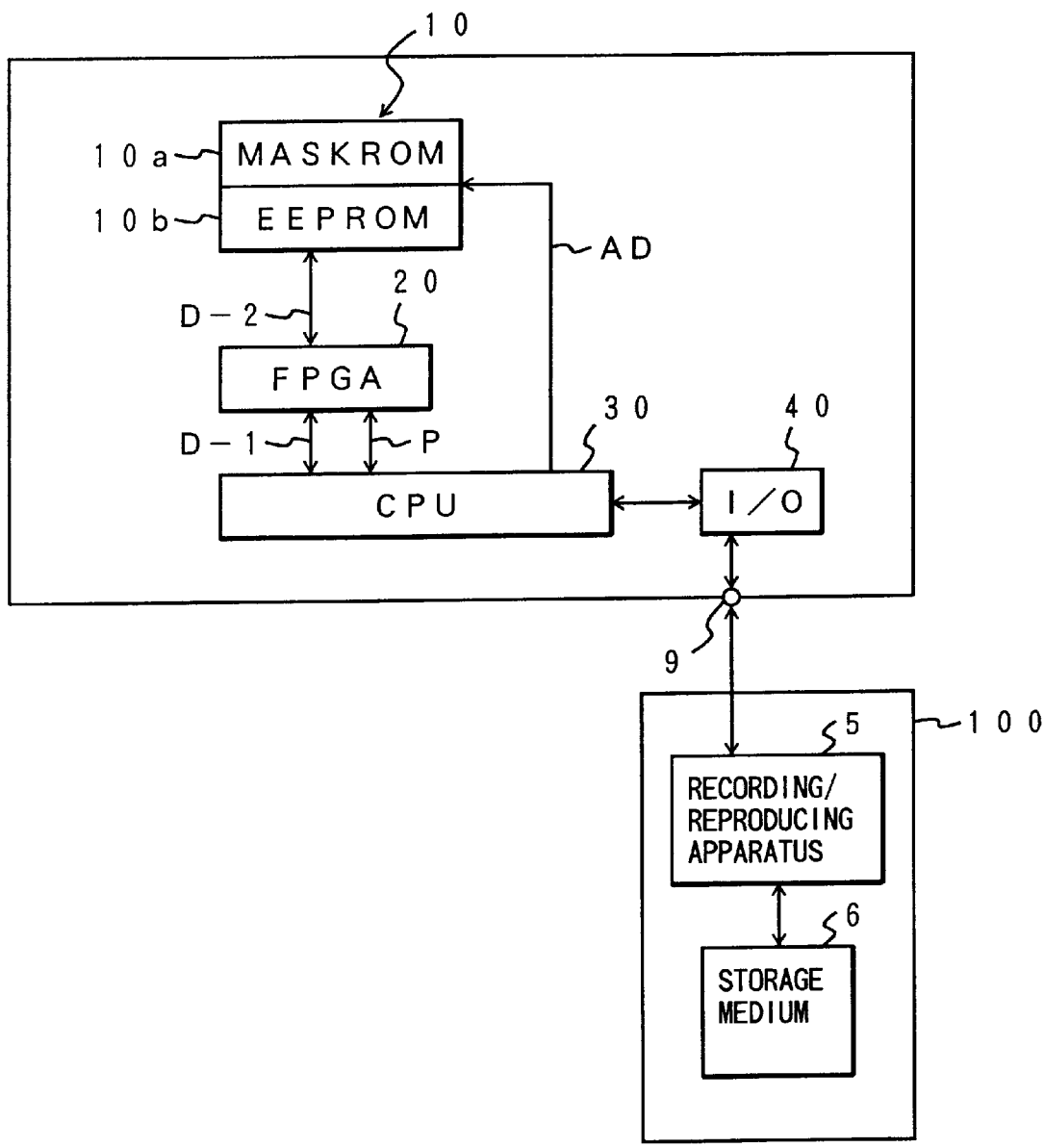
FIG. 4 is a block diagram showing the second embodiment of the semiconductor device according to the present invention.

As shown in FIG. 4, in the same way as with the case of the first embodiment, the semiconductor device is provided with a memory device 10 having a mask ROM 10a and an EEPROM 10b, an FPGA 20 and a CPU 30. The FPGA 20 is used as an interface circuit for ciphering or deciphering data.

The second embodiment is different from the first embodiment in that an address designated by an external apparatus 100 is input to the memory device 10 directly from the CPU 30 and a structural data D-2 output from the memory device 10 is converted into a logical data D-1 by the FPGA 20 and input to the CPU 30.

In more detail, in the second embodiment, the method of deciphering secret data stored in the memory device 10 is executed when the FPGA 20 converts the structural data D-2 (ciphered data) read from the mask ROM 10a into the logical data D-1 used by the CPU 30. In other words, the FPGA 20 receives the structural data D-2 from the mask ROM 10a and converts the data D-2 into the logical data D-1 of the CPU 30. Then, the logical data D-1 is output to the CPU 30.

The operation of the second embodiment of the semiconductor device shown in FIG. 4 is the same as with the case of the first embodiment from when the power is on (in step S1) to when the data are output (in step S5) in FIG. 2. However, the operation of the second embodiment is different from that of the first embodiment after the step S5.

Figure 5:
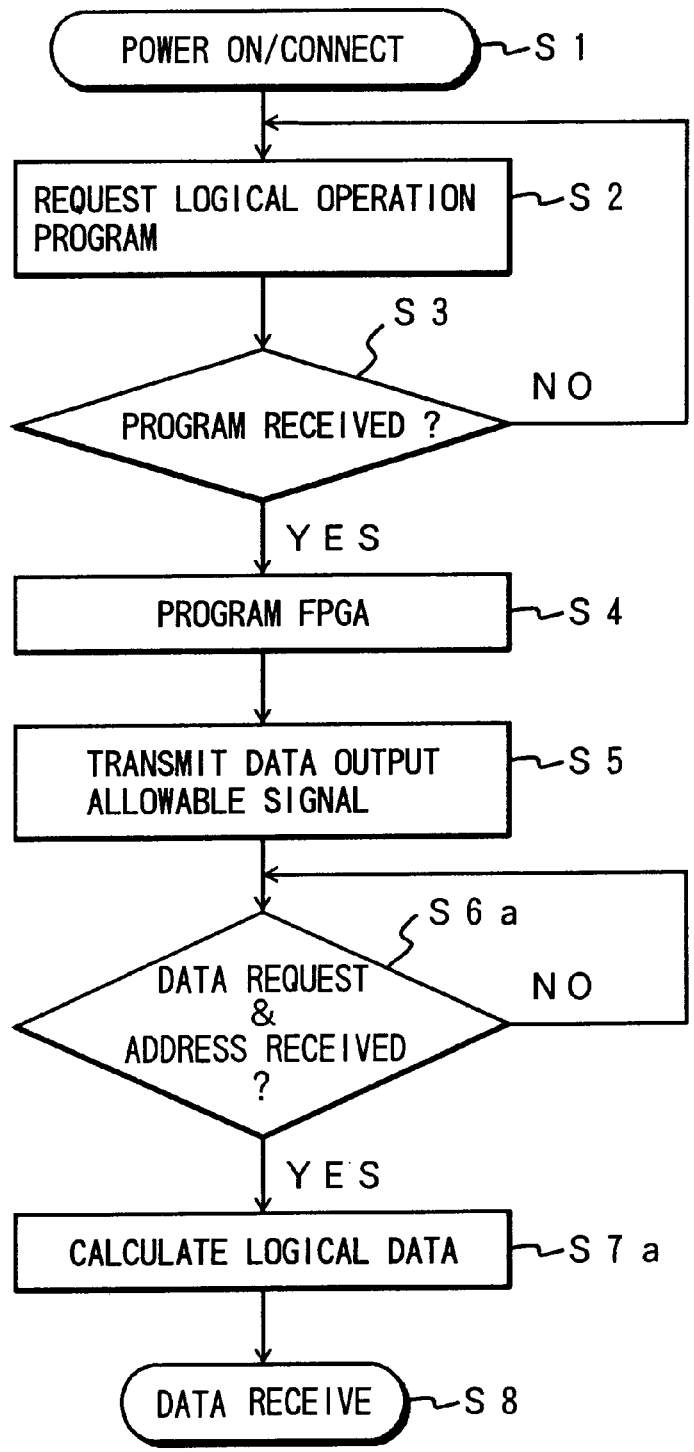
FIG. 5 is a flowchart showing an example of the deciphering operation of the semiconductor device shown in FIG. 4.

In more detail, in step S6a as shown in FIG. 5, when data of an address is requested to be output from the external apparatus 100, the CPU 30 outputs the received address to the mask ROM 10a as it is. The mask ROM 10a reads the structural data D-2 on the basis of the address supplied by the CPU 30, and outputs the read structural data D-2 to the FPGA 20. Then, in step S7a, the FPGA 20 calculates the logical data D-1 on the basis of the structural data D-2 in accordance with the program set by the CPU 30 in step 4, and outputs the calculated logical data D-1 to the CPU 30. In step 8, the CPU 30 outputs the logical data D-1 to the external apparatus 100 via I/O section 40.

As described above, the second embodiment also employs the FPGA 20 to decipher the ciphered and stored data in the same way as with the case of the first embodiment. Therefore, after the program is executed by the FPGA 20, it is possible to output the data at high speed. Further, since the CPU 30 executes data output only while the data are being output, the CPU 30 can execute other calculations. In addition, the circuit scale of the FPGA 20 is smaller than that of the EEPROM. The FPGA 20 thus can be formed at a high integration rate, so that the cost of the semiconductor device can be reduced.

The ciphering operation for storing the ciphered data in the EEPROM 10b shown in FIG. 4 is the same as with the case of the first embodiment shown in FIG. 3, from when the power is on (in step S10) to when the data can be input (in step S50). However, the second embodiment is different from the first embodiment in the operation after the step S60.

Figure 6:
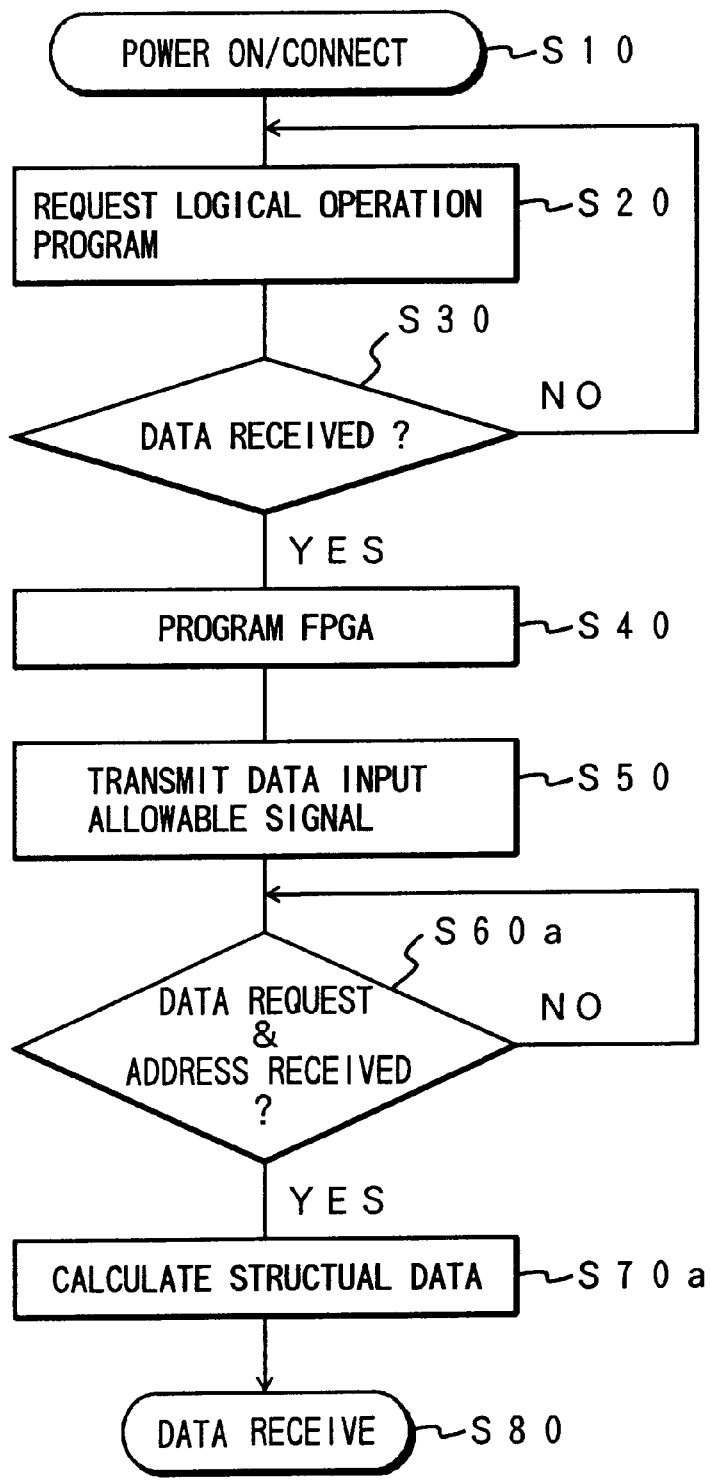
FIG. 6 is a flowchart showing an example of the ciphering operation of the semiconductor device shown in FIG. 4.

As shown in FIG. 6, in step 60a, when the FPGA 20 requests data of an address AD to be output and the data I/O section 40 receives the address AD, the CPU 30 outputs the address AD to the memory device 10. Then, in step S70a, the FPGA 20 calculates the structural data D-2 on the basis of the logical data D-1 in accordance with the program set in step 40. In step S80, the structural data D-2 is stored in the address of the EEPROM 10b supplied by the CPU 30.

As described above, the semiconductor device shown in FIG. 4 further employs the FPGA 20 to cipher the data to be stored. Therefore, after programming the FPGA 20, it is possible to input the data at high speed. Further, the CPU 30 executes data input only while the data is being input. The CPU 30 thus can execute other calculations.

Here, an example of the method of calculating the structural addresses by the FPGA 20 in step S70a will be explained hereinbelow.

The assumption is made that one word (word length) of 16-bit data is read from the EEPROM 10b per address.

These 16-bit data are rearranged in accordance with a predetermined rule, and then stored in the EEPROM 10b.

For instance, in the case of the 16-bit data of ABABh, the ABABh data is represented by binary numerals as $(1010\ 1011\ 1010\ 1011)_2$, and further these values are shifted to the left as $(0101\ 0111\ 0101\ 0111)_2$; in other words, data 5757h is stored in the EEPROM 10b.

As a result, since the ciphered data stored in the EEPROM 10b are different from the original data, it is impossible to decipher the original data.

In order to decipher the data ciphered and then stored in the EEPROM 10b (i.e., processing in step S7a in FIG. 5), when a program for shifting the obtained 16-bit data to the left is written in the FPGA 20, it is possible to read the data deciphered in accordance with this program.

Further, when a user requests to freely rewrite the stored contents electrically in the second embodiment in the same way as with the case of the first embodiment, it is possible to enlarge the capacity of the EEPROM 10b. In this case, a program for ciphering data is written in the FPGA 20, the data supplied by the CPU 30 are ciphered by the FPGA 20, and the ciphered data are supplied to the EEPROM 10b.

Further, in the above-mentioned ciphering and deciphering processing, an addressing program is written in the FPGA 20, when data is written in the EEPROM 10b.

Further, in the second embodiment, since the FPGA 20 of SRAM type is used, when the power is off, the data stored in the FPGA 20 are all destroyed. Therefore, when the power is on again, it is necessary to execute the programming (writing the program for ciphering data) of the FPGA 20 again. However, this problem can be solved by use of the FPGA of EEPROM type, instead of the FPGA of SRAM type.

In this case, codes aie allocated to a plurality of programs for programming the FPGA 20. When the FPGA 20 is programmed, the FPGA 20 is programmed in accordance with a program selected from a plurality of the programs. In this case, the program code is also stored.

When accessing the programmed FPGA 20, the stored program code is output to an external unit via CPU 30. On the basis of the output program code, the external unit changes the way of accessing the semiconductor device of the invention. In other words, since the semiconductor device and the external unit use this program code as a common key, it is possible to decipher secret data in cooperation.

For instance, on the external unit side, an address per byte is shifted by predetermined bits for ciphering and then supplied to the semiconductor device. The FPGA 20 shifts the bits of the supplied address in the opposite direction to obtain an address for the memory device 10. In this case, although the contents themselves stored in the EEPROM 10b are common, when the bit shift rates are changed whenever the data are written in the FPGA 20, a plurality of ciphering methods can be achieved. Therefore, when rewritten very often, it is possible to increase the secrecy degree. Further, in the actual ciphering processing, a more complicated conversion method is adopted on a peripheral unit side, without use of the simple conversion method such as bit shift or reverse bit shift.

Further, in the semiconductor devices shown in FIGS. 1 and 4, it is also possible to adopt such a method that data are stored in the memory device 1 or 10 without ciphering, but ciphered by the FPGA 2 or 20, before output. For instance, in order to prevent secret contents from being leaked due to the interception of communications between the semiconductor device of the present invention and an external unit, the above-mentioned methods can be adopted effectively when the communications contents must be ciphered.

In this case, in the first embodiment, for instance, secret data output from the CPU 3 to the external apparatus 100 via I/O section 4 can be ciphered as follows: the CPU 3 programs a program for interpreting and ciphering data output from the external apparatus 100 into the FPGA 2. Further, the FPGA 2 converts the logical address AD-1 supplied from the CPU 3 into the structural address AD-2.

Further, in the second embodiment, for instance, secret data output from the CPU 30 to the external apparatus 100 via I/O section 40 can be ciphered as follows: the CPU 30 programs a program for interpreting and ciphering data output from the external apparatus 100 into the FPGA 20. Further, after that, the FPGA 20 converts the structural data D-2 (not ciphered data) read from the mask ROM 10a into the logical data D-1 (ciphered data) used for the CPU 30, for ciphering processing.

Further, as the third embodiment, it is possible to combine the first and the second embodiments in such a way that both addresses and data are ciphered and deciphered by use of the FPGAs. This third embodiment can be achieved by providing the FPGA 2 shown in FIG. 1 used for address conversion and the FPGA 20 shown in FIG. 4 used for data conversion separately, and by programming an appropriate program into each FPGA, independently.

Next, the fourth embodiment according to the invention will be explained with reference to FIG. 7.

Figure 7:
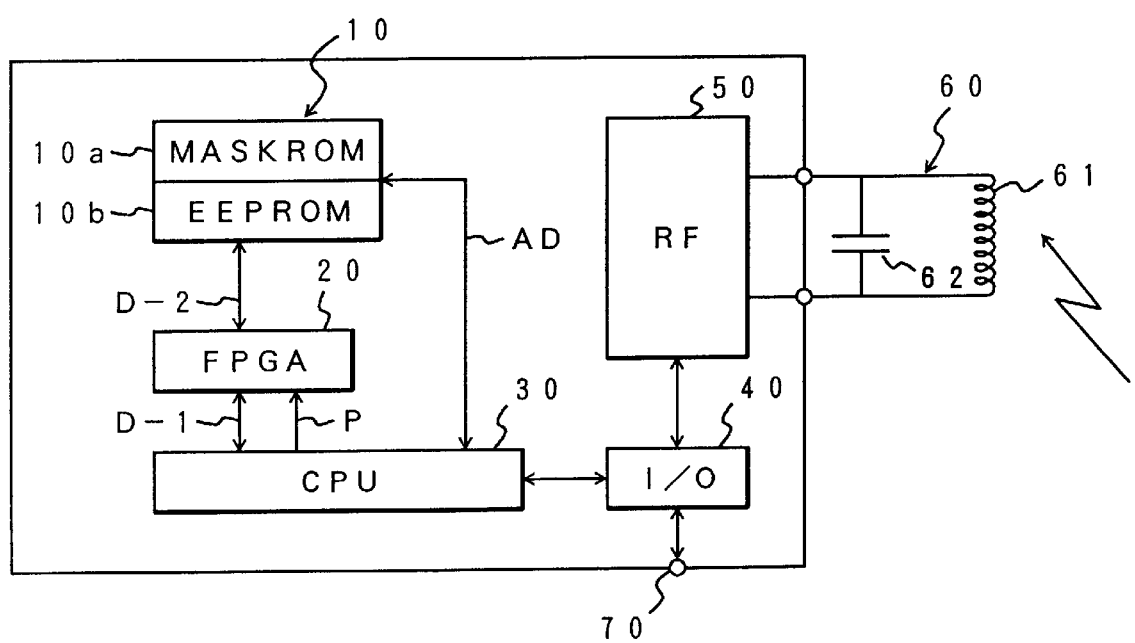
FIG. 7 is a block diagram showing the third embodiment of the semiconductor device according to the present invention.

The semiconductor device shown in FIG. 7 corresponds to the semiconductor device shown in FIG. 4 provided with a radio frequency (RF) section 50 and an antenna circuit 60. The antenna circuit 60 is a parallel oscillating circuit composed of a coil 61 and a capacitor 62. The antenna circuit 60 has functions of receiving power for the semiconductor device from a terminal equipment (not shown) and data communications with the terminal equipment. For example, the antenna circuit 60 is capable of wireless data transmission by means of a high frequency carrier of 1 MHz or more.

In FIG. 7, when a radio wave is received via coil 61 from the terminal equipment, the power is supplied from the radio wave to the RF section 50. The RF section 50 is a circuit for high frequency processing. Thus, the RF section 50 generates a supply voltage from the power to be used in the semiconductor device. Further, the RF section 50 demodulates a signal included in the power, the signal being supplied to the I/O section 40.

Other operations besides that described above are the same as those described with reference to FIG. 4.

When a signal is output from the semiconductor device shown in FIG. 7 to terminal equipment, the operation is in reverse order of the signal reception described above. In detail, the RF section 50 generates a high frequency current by modulating the signal from the I/O section 40 with a high-frequency carrier signal. The generated high frequency current is supplied to the antenna circuit 60 and transmitted to the terminal equipment. In the case of signal transmission/receiving to/from the terminal, the semiconductor device can receive power from the terminal equipment.

As described above, since the semiconductor device of the fourth embodiment is capable of non-contact communications to a terminal equipment, it can be installed in a non-contact type IC card. Such a non-contact type IC card is disclosed in Japanese Utility Model Laid-Open No. 2(1990)-138367. This device is provided with non-contact input/output means and ciphering/deciphering circuits, however, not with an FPGA and EEPROM as in the present invention.

For example, when an IC card with this semiconductor device is employed as a commuting ticket, a commuter can pass a gate as the terminal equipment without contact. Thus, this can relieve congestion at the gate greatly.

When the present invention is applied to a commuting ticket, there is a demand for updating of data, such as the expiry date on the commuting ticket. Such data can be stored in the EEPROM 10b for updating in the semiconductor device shown in FIG. 7. Updating can be executed without contact, and hence secrecy of the stored data can easily be kept compared to conventional cases via mechanical contact.

The semiconductor device shown in FIG. 7 is provided with a terminal 70 for a contact-type IC card. The antenna circuit 60 is drawn in FIG. 7 as protruding from the semiconductor device. However, the antenna circuit 60 can be provided on the surface of an IC card installing the semiconductor device of FIG. 7.

Further, the present invention includes various devices connected to each device shown in FIGS. 1, 4 and 7 to activate each device in order to achieve the above-mentioned embodiments, and further various methods of supplying software programs for achieving the above-mentioned embodiments to a system computer (CPU or MPU) and of activating the respective devices in accordance with the programs stored in the computer.

In this case, since the program codes of the software themselves achieve the above-mentioned embodiments, the program codes themselves and means for supplying the program codes to the computer (e.g., a storage medium for storing the program codes) constitute the present invention.

For instance, in FIG. 1, the recording/reproducing apparatus 5 and the storage medium 6 both provided in the external apparatus 100 are connected to the CPU 3 via I/O section 4. Therefore, the program codes stored in the storage medium 6 are read by the recording/reproducing apparatus 5 to activate the CPU 3 via I/O section 4.

Further, as the storage medium 6 for storing the program codes, a floppy disk, hard disk, optical disk, CD-ROM, magnetic tape, non-volatile memory card, ROM, etc., can be used, for instance.

As described above, the semiconductor device according to the present invention is provided with a memory device, a central processing unit, and electrically rewritable logic circuits. The data ciphering and deciphering can be executed by rewriting the logic of the logical circuits in accordance with ciphering and deciphering programs set by the central processing unit. Further, the data input to the memory device are ciphered and deciphered by the logical circuits whose logic has been already rewritten.

As described above, since the electrically rewritable logic circuits are provided, the circuit configuration which can prevent its logic from being deciphered on the basis of structure analysis can be achieved in a smaller scale, as compared with conventional circuit configurations. In addition, since the logic programmed into the electrically rewritable logic circuits can be executed by way of hardware, the processing speed can be increased.

Further, the central processing unit can execute other processing between the two ciphering or deciphering operations. Therefore, it is possible to provide a semiconductor device with a security protection function for stored contents, by increasing the operation speed and by decreasing the manufacturing cost.

Further, according to the present invention, since data communications with terminal equipment can be conducted without contact, there is little possibility of reading or destroying the stored data by a third party. Thus, the present invention can provide a semiconductor device suitable for an IC card with the device installed therein.

What is claimed is:

1. A semiconductor device comprising:

control means having at least temporarily a program for at least either ciphering or deciphering for generating a signal corresponding to the program;

logic-changeable logical means responsive to the signal for changing logic thereof in accordance with the program and for applying the program to at least either original data or an original address related to the original data with conversion between a logical address and a structural address both related to the original address or between logic data and structural data both related to the original data on basis of changed logic; and a memory device for storing the original or structural data.

2. The semiconductor device of claim 1, wherein the logical means ciphers at least either the data or the address before the data is stored in the memory device.

3. The semiconductor device of claim 1, wherein the logical means ciphers at least either the data or the address when the data is output from the memory device.

4. The semiconductor device of claim 1, wherein the logical means deciphers at least either the data or the address when the data is output from the memory device.

5. The semiconductor device of claim 1, wherein the logical means includes a field programmable gate array.

6. The semiconductor device of claim 1, wherein the memory device includes at least either a mask ROM or an electrically-rewritable non-volatile memory device.

7. The semiconductor device of claim 1 further comprising:

an antenna circuit to execute non-contact data communications with a terminal equipment; and a high frequency processing circuit to generate a supply voltage from power received by the antenna circuit, demodulate a signal sent from the terminal equipment, and generate a high frequency current with the data superimposed thereon, the data being transmitted to the terminal equipment.

8. The semiconductor device of claim 1 further comprising a circuit for contact and non-contact data communications with an external apparatus.

9. A method of code processing used for a semiconductor device having a logic-changeable logical circuit and a control device for controlling the logical circuit, comprising the steps of:

supplying a program for at least either ciphering or deciphering to the control device;

generating a signal corresponding to the program;

applying the signal to the logical circuit to change logic thereof in accordance with the program;

applying the program to at least either original data or an original address related to the original data with conversion between a logical address and a structural address both related to the original address or between logical data and structural data both related to the original data on basis of changed logic; and storing the original or structural data in a memory device.

10. The method of claim 9, wherein the program applying step includes a step of ciphering at least either the data or the address before the data is stored in the memory device.

11. The method of claim 9, wherein the program applying step includes a step of ciphering at least either the data or the address when the data is output from the memory device.

12. The method of claim 9, wherein the program applying step includes a step of deciphering at least either the data or the address when the data is output from the memory device.

13. The method of claim 9, wherein the data storing step includes a step of storing the data at the ciphered address of the memory device.

14. A computer readable medium storing program code for causing a computer to apply a program for at least either ciphering or deciphering to data of a semiconductor device having a logic-changeable logical circuit, and a control device for controlling the logical circuit, comprising:

first program code means for supplying the program to the control device;

second program code means for generating a signal corresponding to the program;

third program code means for applying the signal to the logical circuit to change logic thereof in accordance with the program;

fourth program code means for applying the program to at least either original data or an original address related to the original data on basis of changed logic with conversion between a logical address and a structural address both related to the original address or between logical data and structural data both related to the original data; and fifth program code means for storing the original or structural data in a memory device.

15. The computer readable medium of claim 14, wherein the fourth program code means includes program code means for ciphering at least either the data or the address before the data is stored in the memory device.

16. The computer readable medium of claim 14, wherein the fourth program code means includes program code means for ciphering at least either the data or the address when the data is output from the memory device.

17. The computer readable medium of claim 14, wherein the fourth program code means includes program code means for deciphering at least either the data or the address when the data is output from the memory device.

18. The computer readable medium of claim 14, wherein the fifth program code means includes program code means for storing the data at the ciphered address of the memory device.

19. A semiconductor device comprising:

control means having at least temporarily a program for at least either ciphering or deciphering for generating a first signal corresponding to the program;

logic-changeable logical means responsive to the first signal for changing logic thereof in accordance with the program; and a memory device for storing data, wherein the logic-changeable logical means applies the program to at least either the data or an address related to the data when the data is output from the memory device in response to a second signal output from the control means to the memory device.

20. The semiconductor device of claim 19, wherein the logical means includes a field programmable gate array.

21. The semiconductor device of claim 19, wherein the memory device includes at least either a mask ROM or an electrically-rewritable non-volatile memory device.

22. The semiconductor device of claim 19 further comprising:

an antenna circuit to execute non-contact data communications with a terminal equipment; and a high frequency processing circuit to generate a supply voltage from power received by the antenna circuit, demodulate a signal sent from the terminal equipment, and generate a high frequency current with the data superimposed thereon, the data being transmitted to the terminal equipment.

23. The semiconductor device of claim 19 further comprising a circuit for contact and non-contact data communications with an external apparatus.

24. A method of code processing used for a semiconductor device having a logic-changeable logical circuit and a control device for controlling the logical circuit, comprising the steps of:

supplying a program for at least either ciphering or deciphering to the control device;

generating a first signal corresponding to the program;

applying the first signal to the logical circuit to change logic thereof in accordance with the program;

storing data in a memory device; and applying the program to at least either the data or an address related to the data on basis of changed logic when the data is output from the memory device in response to a second signal output from the control device to the memory device.

25. The method of claim 24, wherein the data storing step includes a step of storing the data at the ciphered address of the memory device.

26. A computer readable medium storing program code for causing a computer to apply a program for at least either ciphering or deciphering to data of a semiconductor device having a logic-changeable logical circuit, and a control device for controlling the logical circuit, comprising:

first program code means for supplying the program to the control device;

second program code means for generating a first signal corresponding to the program;

third program code means for storing data in a memory device; and fifth program code means for applying the program to at least either the data or an address related to the data on basis of changed logic when the data is output from the control device to the memory device.

27. The computer readable medium of claim 26, wherein the fourth program code means includes program code means for storing the data at the ciphered address of the memory device.

* * * * *